United States Patent
Konno et al.

(10) Patent No.: US 9,568,071 B2
(45) Date of Patent: Feb. 14, 2017

(54) CHAIN GUIDE

(71) Applicant: TSUBAKIMOTO CHAIN CO., Osaka-shi, Osaka (JP)

(72) Inventors: Masahiko Konno, Osaka (JP); Yuichiro Ishikawa, Osaka (JP); Yuji Kurematsu, Osaka (JP)

(73) Assignee: TSUBAKIMOTO CHAIN CO., Osaka-shi, Osaka (JP)

( * ) Notice: Subject to any disclaimer, the term of this patent is extended or adjusted under 35 U.S.C. 154(b) by 239 days.

(21) Appl. No.: 14/320,950

(22) Filed: Jul. 1, 2014

(65) Prior Publication Data
US 2015/0024889 A1    Jan. 22, 2015

(30) Foreign Application Priority Data

Jul. 22, 2013  (JP) .................................. 2013-151676

(51) Int. Cl.
*F16H 7/08*  (2006.01)
*F16H 7/18*  (2006.01)

(52) U.S. Cl.
CPC *F16H 7/08* (2013.01); *F16H 7/18* (2013.01); *F16H 2007/0872* (2013.01); *F16H 2007/0893* (2013.01); *F16H 2007/185* (2013.01)

(58) Field of Classification Search
CPC ...... F16H 7/08; F16H 7/18; F16H 2007/0872; F16H 2007/185
USPC ....................................................... 474/111
See application file for complete search history.

(56) References Cited

U.S. PATENT DOCUMENTS

| | | | |
|---|---|---|---|
| 6,733,409 B2* | 5/2004 | Konno | F16H 7/18 474/111 |
| 2002/0077204 A1 | 6/2002 | Kumakura | |
| 2002/0128100 A1* | 9/2002 | Inoue | F16H 7/18 474/111 |
| 2002/0132688 A1 | 9/2002 | Ono | |
| 2003/0139237 A1 | 7/2003 | Konno et al. | |
| 2005/0277506 A1* | 12/2005 | Konno | F16H 7/18 474/111 |
| 2007/0173362 A1* | 7/2007 | Ullein | F01L 1/024 474/140 |

(Continued)

FOREIGN PATENT DOCUMENTS

| | | |
|---|---|---|
| JP | H04-119652 U | 10/1992 |
| JP | 2002-181145 A | 6/2002 |

(Continued)

*Primary Examiner* — William E Dondero
*Assistant Examiner* — Robert T Reese
(74) *Attorney, Agent, or Firm* — Westerman, Hattori, Daniels & Adrian, LLP

(57) ABSTRACT

The present invention provides a highly durable chain guide which is simply configured, easy to assemble, and low in material cost, and in which vibration and tilting are suppressed, enabling reductions in noise, wear, breakage, and so on. A guide shoe includes a plate housing portion which is formed on a rear surface side of a travel guiding portion, and into which a plate can be inserted from below, and in at least one location of an attachment portion or a tensioner contact portion, the plate housing portion constitutes a plate end holding portion formed to be capable of supporting an end portion of the plate from below such that the plate can be inserted therein from a direction other than from below.

4 Claims, 10 Drawing Sheets

(56) References Cited

U.S. PATENT DOCUMENTS

| | | | | |
|---|---|---|---|---|
| 2014/0087903 A1* | 3/2014 | Maeda | ............... | F16H 7/18 474/111 |
| 2014/0256487 A1* | 9/2014 | Ketterl | ............... | F16H 7/18 474/111 |
| 2015/0105197 A1* | 4/2015 | Kato | ............ | F16H 7/18 474/111 |
| 2015/0219190 A1* | 8/2015 | Geibel | ............... | F16H 7/18 474/111 |

FOREIGN PATENT DOCUMENTS

| | | | |
|---|---|---|---|
| JP | 2002-266964 | A | 9/2002 |
| JP | 2003-130156 | A | 5/2003 |
| JP | 2003-214505 | A | 7/2003 |
| JP | 2004-060782 | A | 2/2004 |
| JP | 2004-069008 | | 3/2004 |
| JP | 2006-2810 | A | 1/2006 |
| KR | 2002-0073271 | A | 9/2002 |

\* cited by examiner

FIG. 6
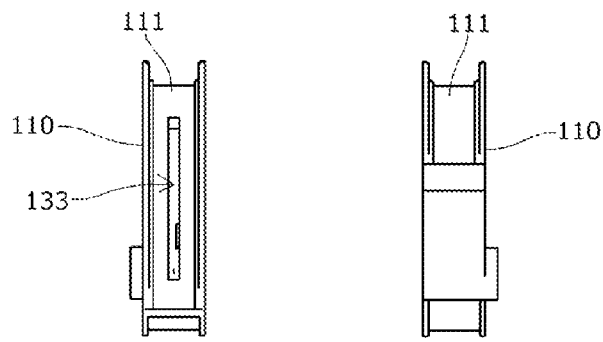
FIG. 7
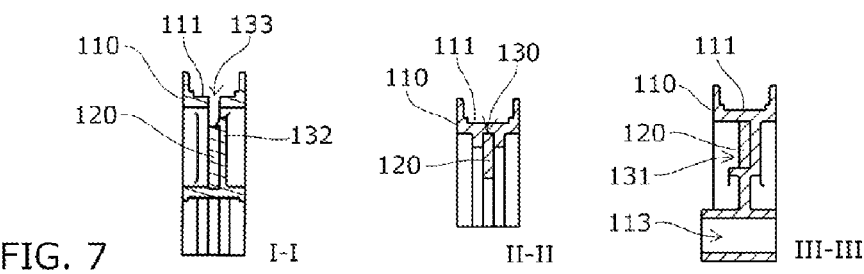
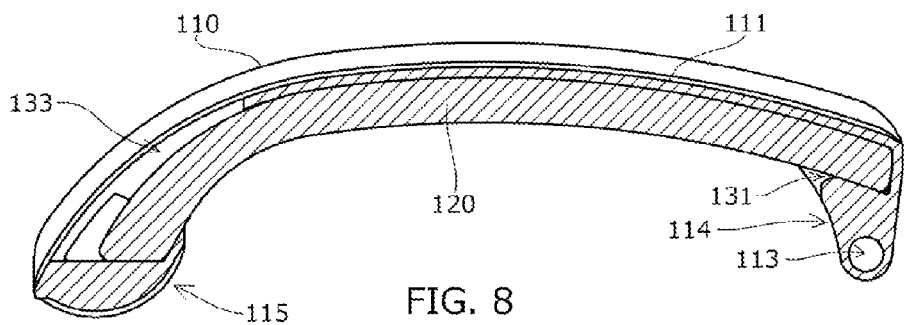
FIG. 8

FIG. 12
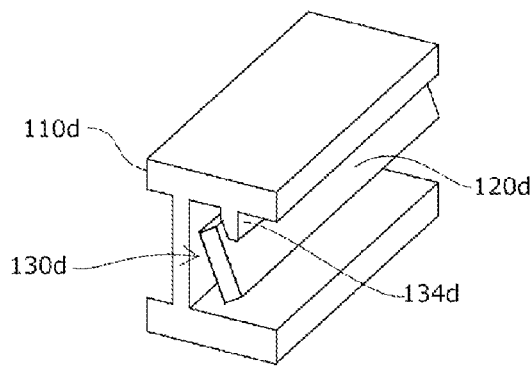
FIG. 13
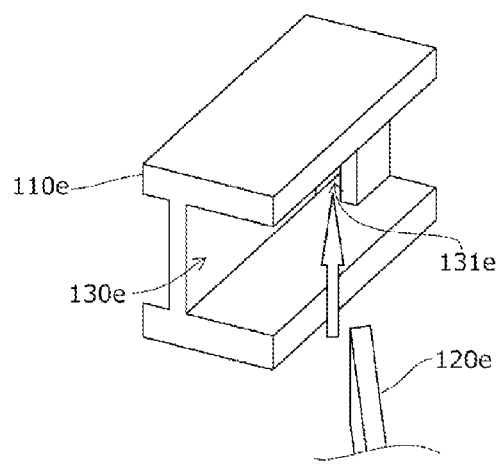
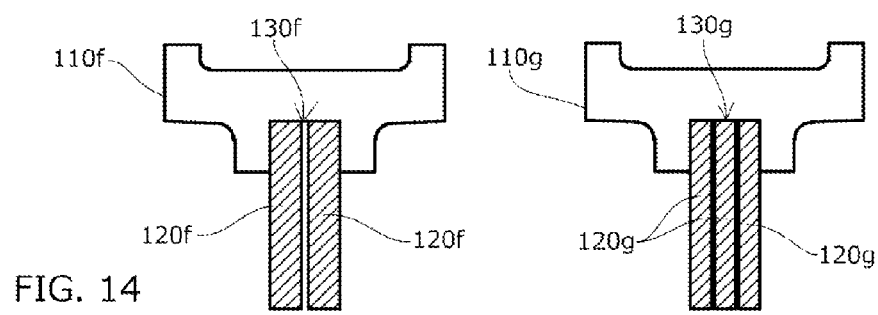
FIG. 14

Related Art

Related Art

CHAIN GUIDE

BACKGROUND OF THE INVENTION

1. Field of the Invention

The present invention relates to a chain guide having a guide shoe that guides a traveling chain by sliding against the traveling chain, and a plate that reinforces the guide shoe in a chain travel direction.

2. Description of the Related Art

A chain guide having a guide shoe that guides a chain traveling between sprockets by sliding against the chain is commonly used conventionally to stabilize the traveling chain and maintain an appropriate level of tension.

As shown in FIG. 19, for example, in a conventional timing system for an engine, in which a transmission chain CH such as a roller chain wound endlessly between sprockets S1, S2 provided respectively on a crankshaft and a cam shaft in an engine room E is caused to travel, the timing chain CH is wound endlessly between a drive sprocket S1 attached to the crankshaft in the engine room E and a pair of driven sprockets S2 attached to the cam shaft, and the timing chain CH is guided by a swinging chain guide (a swinging guide) 500 and a chain guide (a fixed guide) 600.

In this conventional timing system, the fixed guide 600 is fixed within the engine room E by two fixing attachment shafts Q, while the swinging guide 500 is attached within the engine room E to be capable of swinging about a swinging attachment shaft P in a winding plane of the timing chain CH.

A chain tensioner T maintains a tension of the timing chain CH at an appropriate level and suppresses vibration of the timing chain CH by pressing the swinging guide 500.

The chain guide (swinging guide) 500 and chain guide (fixed guide) 600 used in this conventional timing system are formed integrally from synthetic resin, and therefore, to secure sufficient rigidity and durability in the chain guides, respective guide main bodies thereof must be increased in size to realize improvements in the rigidity and durability. In so doing, however, it becomes difficult to achieve a compact design for the engine room E.

Therefore, in a conventional configuration (see Japanese Patent Application Publication No. 2006-2810, Japanese Patent Application Publication No. 2003-130156, Japanese Patent Application Publication No. 2002-266964, and so on), as shown in FIGS. 20 to 22, a chain guide 500 is provided with a guide shoe 510 that guides a traveling chain by sliding against the traveling chain and a plate 520 that reinforces the guide shoe 510 in a chain travel direction, a slit groove 512 serving as a plate housing portion into which the plate 520 can be inserted from below is provided on a rear surface side of a travel guiding portion 511 of the guide shoe 510, and the highly rigid and durable plate 520 is inserted into the slit groove 512 from below. With this configuration, strength, rigidity, and durability required of the chain guide 500 as a whole are secured while reducing an amount of space occupied thereby.

SUMMARY OF THE INVENTION

The conventional chain guide 500 is configured such that the plate 520 is inserted into the slit groove 512 serving as the plate housing portion of the guide shoe 510 from below. Accordingly, the chain guide 500 includes an attachment portion 514 for attaching the guide shoe 510 to an attachment subject and a tensioner contact portion 515 that contacts a tensioner, while a space below the slit groove 512 serving as the plate housing portion is entirely open.

Further, the attachment portion 514 of the guide shoe 510 is provided with an attachment hole 513 into which an attachment shaft P for attaching the guide shoe 510 to the attachment subject is inserted, and the slit groove 512 is also provided in a part of the guide shoe 510 constituting the attachment hole 513 such that the plate 520 is inserted therein. Accordingly, an attachment hole 521 for inserting the attachment shaft P is also provided in the plate 520.

In the attachment portion 514 of the guide shoe 510, the plate 520 inserted into the slit groove 512 is prevented from falling out by inserting the attachment shaft P into the attachment hole 521, but in other locations, the space below the slit groove 512 is entirely open, and therefore a member that fixes the plate 520 reliably by deforming elastically must be provided on the guide shoe 510 side.

As a result, a reduction in durability occurs in the elastically deforming location of the guide shoe 510, and an operation to insert the plate 520 fixedly becomes laborious.

Furthermore, it is difficult to align the attachment hole 513 in the guide shoe 510 perfectly with a diameter of the attachment hole 521 in the plate 520, and when the diameter of the attachment hole 521 in the plate 520 is smaller, as shown in FIG. 23, a peripheral edge portion of the attachment hole 521 in the plate 520 may contact the attachment shaft P during attachment to the attachment subject, leading to deformation and breakage.

To avoid this problem, respective centers of the attachment hole 521 in the plate 520 and the attachment shaft P must be aligned precisely during attachment, leading to a reduction in the efficiency of an assembly operation.

Further, the chain guide 500 is supported by the attachment shaft P only over a width of the attachment hole 521 in the plate 520, and therefore, as shown in FIG. 24, the chain guide 500 is likely to tilt from an original attitude. When the chain guide 500 tilts, travel by the chain that is guided by the chain guide 500 becomes unstable, leading to increases in noise and wear.

Conversely, when the diameter of the attachment hole 521 in the plate 520 is larger, as shown in FIG. 25, a gap is formed between the attachment hole 521 and the attachment shaft P such that the plate 520 moves within the slit groove 512 during use. As a result, the plate 520 may collide repeatedly with a bottom portion of the slit groove 512 and the attachment shaft P, leading to noise, wear, and possible breakage.

Furthermore, the attachment hole 513 in the guide shoe 510, which is made of resin or the like and is therefore low in strength and rigidity, is supported by the attachment shaft P, and therefore a width direction dimension thereof must be increased to a certain extent.

Moreover, the attachment portion 514 for attaching the guide shoe 510 to the attachment subject and the tensioner contact portion 515 that contacts the tensioner are parts that receive a maximum pressing force during guiding of the chain, and must therefore have a larger dimension in an up-down direction than other parts. Since the plate 520 is also inserted into the slit groove 512 in the attachment portion 514 and the tensioner contact portion 515, the plate 520 must have a dimension that extends through the open space below the slit groove 512.

The plate 520 is typically manufactured by being punched out of rolled steel plate, which exhibits superior strength, rigidity, and durability, or the like, and in order to obtain a large dimension in the up-down direction, a large amount of material is required. Therefore, as shown in FIG. 26, even when the up-down direction dimensions of parts other than the attachment portion 514 and the tensioner contact portion 515 are small, a large amount of remaining material Z is generated after the plate 520 is punched out of rolled steel plate K.

An object of the present invention is to solve the problems described above by providing a highly durable chain guide which is simply configured, easy to assemble, and low in material cost, and in which vibration and tilting are suppressed, enabling reductions in noise, wear, breakage, and so on.

The present invention solves the problems described above by providing a chain guide having a guide shoe that guides a traveling chain by sliding against the traveling chain and a plate that reinforces the guide shoe in a chain travel direction, wherein the guide shoe includes a travel guiding portion that extends in the chain travel direction, a plate housing portion formed on a rear surface side of the travel guiding portion, into which the plate can be inserted, and at least one of an attachment portion for attaching the guide shoe to an attachment subject and a tensioner contact portion that contacts a tensioner, and in at least one location of the attachment portion or the tensioner contact portion, the plate housing portion constitutes a plate end holding portion formed to be capable of supporting an end portion of the plate from below such that the plate can be inserted therein from a direction other than from below.

The present invention solves the problems described above by providing a guide shoe having a travel guiding portion that extends in a chain travel direction and a plate housing portion formed on a rear surface side of the travel guiding portion, into which a plate can be inserted, wherein the guide shoe includes at least one of an attachment portion for attaching the guide shoe to an attachment subject and a tensioner contact portion that contacts a tensioner, and in at least one location of the attachment portion or the tensioner contact portion, the plate housing portion constitutes a plate end holding portion formed to be capable of supporting an end portion of the plate from below such that the plate can be inserted therein from a direction other than from below.

In the chain guide according to claim 1, the plate, which provides strength, rigidity, and durability, is formed from a different material to the guide shoe, and the plate can be housed in the plate housing portion provided on the rear surface side of the travel guiding portion of the guide shoe. As a result, the chain guide can be configured simply and assembly easily, and the strength, rigidity, and durability required of the chain guide as a whole can be secured while reducing an amount of space occupied thereby.

Further, in at least one location of the attachment portion or the tensioner contact portion, the plate housing portion constitutes the plate end holding portion formed to be capable of supporting the end portion of the plate from below such that the plate can be inserted therein from a direction other than from below, and therefore the plate does not have to be supported directly by an attachment shaft or the tensioner in the plate end holding portion. As a result, an overall up-down direction dimension of the plate can be reduced such that the plate can be manufactured from a smaller amount of material.

Furthermore, the plate end holding portion is formed to be capable of supporting the end portion of the plate from below such that the plate can be inserted therein from a direction other than from below, and therefore only movement of the plate in an insertion direction into the plate end holding portion need be restricted when fixing the plate to the plate housing portion. As a result, a fixing member can be simplified, whereby a reduction in the durability of the guide shoe can be suppressed and an operation to insert the plate fixedly can be performed easily.

According to a configuration described in claim 2, the attachment hole in the guide shoe does not overlap the plate housing portion, and therefore an attachment hole does not have to be provided in the plate. Hence, the up-down direction dimension of a part of the plate housed in the vicinity of the attachment portion can be further reduced such that the plate can be manufactured from an even smaller amount of material.

Further, the up-down direction dimension of the plate can be set to vary little over the entire lengthwise direction thereof, and therefore an amount of remaining material generated when the plate is punched out of rolled steel plate or the like can be reduced, enabling a further reduction in material cost.

According to a configuration described in claim 3, the plate housing portion includes the plate fixing piece that restricts movement of the plate in the chain travel direction. Hence, the plate housing portion can be configured such that the plate can only be inserted into the plate end holding portion in the travel direction, whereby the end portion of the plate can be supported reliably by the plate end holding portion from the side and below. Further, the plate fixing piece need only restrict movement of the plate, on which a small load is exerted during use, in the travel direction, and can therefore be configured with a simple structure. As a result, the operation to insert the plate fixedly into the plate housing portion can be performed easily.

According to a configuration described in claim 4, the plate is formed to be rectilinear or to have a constant curvature radius respectively on both an upper end surface thereof on a travel guiding surface side and a lower end surface thereof on an opposite side, and therefore the plate can be formed in a simple shape such that a die for punching the plate out of rolled steel plate or the like can be simplified. Moreover, the amount of generated remaining material can be reduced, enabling a further reduction in material cost.

Furthermore, since the plate is formed in a shape having an unvarying curvature radius in the lengthwise direction, stress concentration does not occur when the plate receives force, and as a result, the rigidity and strength thereof can be improved.

According to a configuration described in claim 5, the curvature radius of the upper end surface is equal to or smaller than the curvature radius of the lower end surface, and therefore up-down direction dimensions of respective end portions of the plate can be reduced in comparison with an intermediate portion, enabling a reduction in the up-down direction dimension of the plate end holding portion. As a result, the attachment portion of the guide shoe can be reduced in size while avoiding overlap between the attachment hole and the plate housing portion.

According to a configuration described in claim 6, the plate housing portion includes a plate insertion hole into which the plate can be inserted in the chain travel direction. Hence, the plate housing portion can be configured such that the plate can only be inserted into the plate end holding portion in the travel direction, whereby the end portion of the plate can be supported reliably by the plate end holding portion from the side and below. Furthermore, the operation to insert the plate fixedly into the plate housing portion can be performed easily.

According to a configuration described in claim 7, the plate insertion hole opens onto a front surface of the travel guiding portion, and therefore the plate can be inserted into the plate housing portion rectilinearly, whereby the end portion of the plate can be inserted into the plate end holding portion easily. Furthermore, the operation to insert the plate fixedly into the plate housing portion can be performed easily.

According to a configuration described in claim 8, the plate housing portion is configured such that the plate can be inserted therein from the side so as to be supported thereby from below. Hence, the operation to insert the plate fixedly can be performed by inserting the plate from the side and then moving the plate in the travel direction such that the end portion of the plate is inserted into the plate end holding portion, or inserting the entire plate into the plate housing portion while inserting the end portion of the plate into the plate end holding portion diagonally from the side. As a result, the operation to insert the plate fixedly can be performed easily, and the plate can be prevented from falling out reliably.

According to a configuration described in claim 9, the plate housing portion includes an engagement piece provided in a location other than the plate end holding portion to prevent the plate from falling out sideward or downward, and therefore the plate can be prevented from falling out even more reliably.

According to a configuration described in claim 10, two or more of the plates are inserted in a width direction, and therefore the respective plates can be reduced in thickness, enabling a reduction in the cost required to punch the plates out of rolled steel plate or the like. Furthermore, by inserting the plates in a plurality, the overall required strength, rigidity, and durability can be secured.

According to a configuration described in claim 11, two or more of the plate housing portions are provided in parallel in the width direction. Hence, the plurality of plates can be inserted in and fixed to the separate plate housing portions individually, and therefore the plates do not have to be bundled and handled simultaneously even when provided in a plurality. As a result, the operation to insert the plates fixedly can be performed easily.

Further, in a case where an engagement location or the like that engages with the plate from a thickness direction of the plate is provided in the plate housing portion in order to fix the plate, the plurality of plates can be engaged with and fixed to the separate plate housing portions individually and reliably.

In the guide shoe according to claim 12, in at least one location of the attachment portion or the tensioner contact portion, the plate housing portion constitutes the plate end holding portion formed to be capable of supporting the end portion of the plate from below such that the plate can be inserted therein from a direction other than from below. Hence, the plate does not have to be supported directly by the attachment shaft or the tensioner in the plate end holding portion, and therefore the overall up-down direction dimension of the plate can be reduced such that the plate can be manufactured from a smaller amount of material.

Further, the plate end holding portion is formed to be capable of supporting the end portion of the plate from below such that the plate can be inserted therein from a direction other than from below, and therefore only movement of the plate in the insertion direction into the plate end holding portion need be restricted when fixing the plate to the plate housing portion. As a result, a fixing member can be simplified, whereby a reduction in the durability of the guide shoe can be suppressed and the operation to insert the plate fixedly can be performed easily.

BRIEF DESCRIPTION OF THE DRAWINGS

FIG. 6 is a front view and a back view of the chain guide according to the first embodiment of the present invention;

FIG. 7 is a sectional view showing I-I, II-II, and III-III cross-sections of FIG. 3;

FIG. 8 is a sectional view showing a IV-IV cross-section of FIG. 4;

FIG. 12 is an illustrative view showing plate insertion in a chain guide according to a fifth embodiment of the present invention;

FIG. 13 is an illustrative view showing plate insertion in a chain guide according to a sixth embodiment of the present invention;

FIG. 14 is a sectional illustrative view showing a chain guide according to a seventh embodiment of the present invention;

DESCRIPTION OF THE PREFERRED EMBODIMENTS

Figure 1:
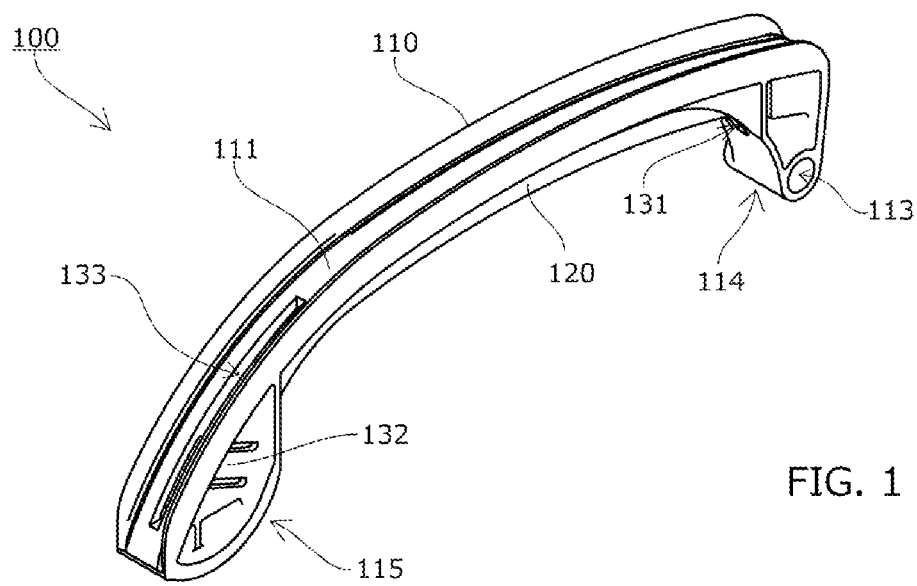
FIG. 1 is a perspective view showing a chain guide according to a first embodiment of the present invention from above.

As long as a chain guide according to the present invention is a chain guide having a guide shoe that guides a traveling chain by sliding against the traveling chain and a plate that reinforces the guide shoe in a chain travel direction, wherein the guide shoe includes a travel guiding portion that extends in the chain travel direction, a plate housing portion formed on a rear surface side of the travel guiding portion, into which the plate can be inserted, and at least one of an attachment portion for attaching the guide shoe to an attachment subject and a tensioner contact portion that contacts a tensioner, and in at least one location of the attachment portion or the tensioner contact portion, the plate housing portion constitutes a plate end holding portion formed to be capable of supporting an end portion of the plate from below such that the plate can be inserted therein from a direction other than from below, thereby forming a highly durable chain guide which is simply configured, easy to assemble, and low in material cost, and in which vibration and tilting are suppressed, enabling reductions in noise, wear, breakage, and so on, there are no limits on a specific configuration thereof.

Further, as long as a guide shoe according to the present invention is a guide shoe having a travel guiding portion that extends in a chain travel direction and a plate housing portion formed on a rear surface side of the travel guiding portion, into which a plate can be inserted, wherein the guide shoe includes at least one of an attachment portion for attaching the guide shoe to an attachment subject and a tensioner contact portion that contacts a tensioner, and in at least one location of the attachment portion or the tensioner contact portion, the plate housing portion constitutes a plate end holding portion formed to be capable of supporting an end portion of the plate from below such that the plate can be inserted therein from a direction other than from below, thereby forming a highly durable chain guide which is simply configured, easy to assemble, and low in material cost, and in which vibration and tilting are suppressed, enabling reductions in noise, wear, breakage, and so on, there are no limits on a specific configuration thereof.

The guide shoe is preferably formed from a synthetic resin material, but an appropriate conventional material may be selected in accordance with conditions relating to frictional resistance, rigidity, durability, moldability, cost, and so on.

First Embodiment

A chain guide 100 (a swinging guide) according to a first embodiment of the present invention will be described below on the basis of the drawings.

The chain guide 100 is applied to the conventional timing system described above, and as shown in FIGS. 1 to 8, includes a guide shoe 110 that guides a traveling chain by sliding against the chain, and a plate 120 that supports the guide shoe 110 in a chain travel direction.

The plate 120 is constituted by a plate-shaped member that extends in the chain travel direction, to which a predetermined curved shape is applied in the chain travel direction.

The plate 120 has a uniform thickness in the chain travel direction, and is manufactured by being punched out of rolled steel plate or the like.

The guide shoe 110 includes a travel guiding portion 111 extending in the chain travel direction, a plate housing portion 130 formed on a rear surface side of the travel guiding portion 111, into which the plate 120 can be inserted, an attachment portion 114 for attaching the guide shoe 110 to an attachment subject, and a tensioner contact portion 115 that contacts a tensioner, and is formed from a synthetic resin material and molded integrally by injection molding or the like, for example.

The attachment portion 114 is formed to extend along the rear surface side of the travel guiding portion 111, and is provided with an attachment hole 113 into which a bolt or the like for attaching the attachment portion 114 to the attachment subject is inserted.

A plate insertion hole 133 into which the plate 120 can be inserted in the chain traveling direction is opened in the plate housing portion 130 on a tensioner contact portion 115 side front surface of the travel guiding portion 111.

Figure 2:
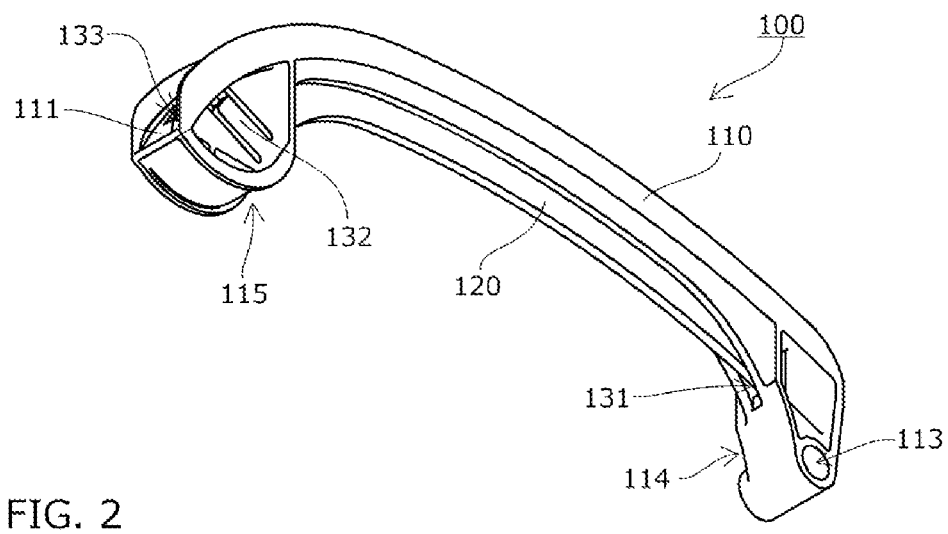
FIG. 2 is a perspective view showing the chain guide according to the first embodiment of the present invention from below.
Figure 3:
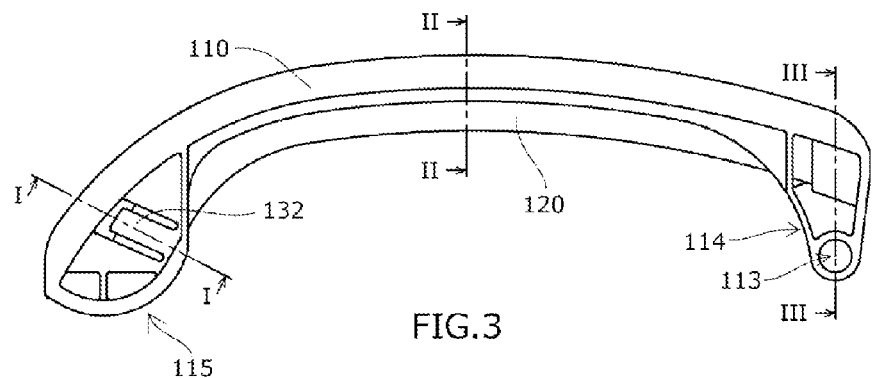
FIG. 3 is a side view of the chain guide according to the first embodiment of the present invention.
Figure 4:
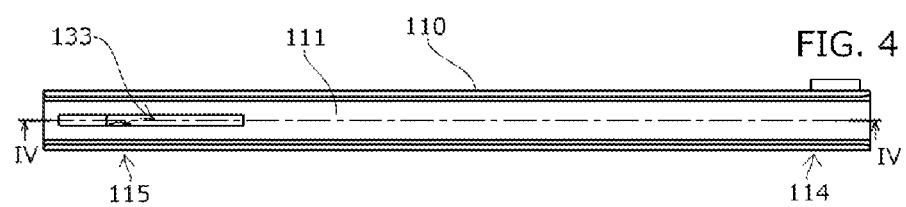
FIG. 4 is a plan view of the chain guide according to the first embodiment of the present invention.
Figure 5:
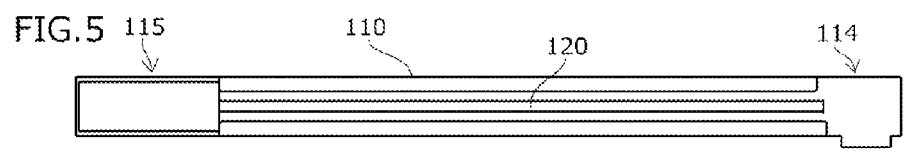
FIG. 5 is a bottom view of the chain guide according to the first embodiment of the present invention.

In the vicinity of the attachment portion 114, as shown in FIGS. 1 to 3, a III-III cross-section in FIG. 7, FIG. 8, and so on, the plate housing portion 130 constitutes a plate end holding portion 131 formed to be capable of supporting an end portion of the plate 120 from below such that the plate 120 can be inserted therein from a direction other than from below, and the plate end holding portion 131 is provided between the travel guiding portion 111 and the attachment hole 113 in a position that does not overlap the attachment hole 113.

Further, in the vicinity of the tensioner contact portion 115, as shown in FIGS. 1 to 3, a I-I cross-section in FIG. 7, and so on, the plate housing portion 130 includes a plate fixing piece 132 that engages with the plate 120 when the plate 120 is inserted so as to restrict movement thereof in the chain travel direction.

Furthermore, in a region between the attachment portion 114 and the tensioner contact portion 115, as shown in FIGS. 1 to 3, a II-II cross-section in FIG. 7, and so on, the plate housing portion 130 is formed in a groove shape that opens downward and has a smaller up-down direction dimension than the plate 120.

The chain guide 100 according to the first embodiment of the present invention, configured as described above, is assembled by inserting the plate 120 in a straight line through the plate insertion hole 133 provided in the tensioner contact portion 115 side front surface of the travel guiding portion 111 such that an end portion of the plate 120 is held by the plate end holding portion 131 and movement thereof in the chain travel direction is restricted by the plate fixing piece 132, whereby the plate 120 is fixed.

The plate fixing piece 132 need only restrict movement of the plate 120, on which a small load is exerted during use, in the travel direction, and can therefore be configured with a simple structure. Furthermore, an operation to insert the plate 120 fixedly into the plate housing portion 130 can be performed easily.

Further, since the plate end holding portion 131 is provided in a position that does not overlap the attachment hole 113 in the guide shoe 110, there is no need to provide an attachment hole in the plate 120, and therefore an up-down direction dimension of the plate 120 can be set to vary little over an entire lengthwise direction thereof.

Figure 16:
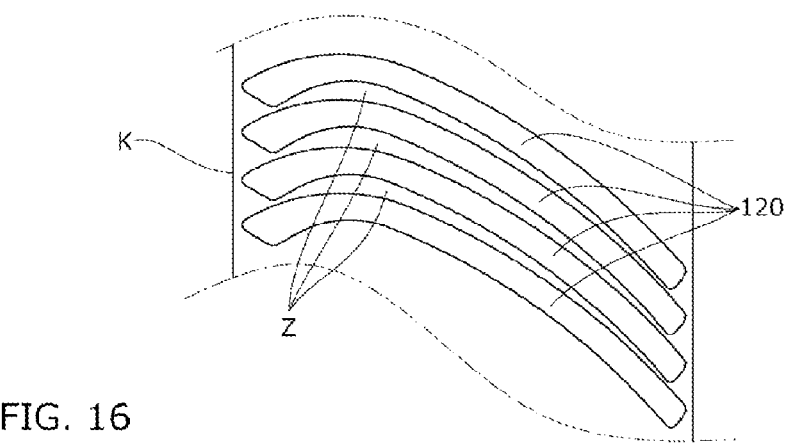
FIG. 16 is an illustrative manufacturing diagram showing a plate of the chain guide according to the first embodiment of the present invention.

As a result, as shown in FIG. 16, an amount of remaining material z generated when the plate 120 is punched out of rolled steel plate K can be reduced, enabling a reduction in material cost.

Furthermore, according to this embodiment, in the region between the attachment portion 114 and the tensioner contact portion 115, the plate housing portion 130 is formed in a groove shape that opens downward and has a smaller up-down direction dimension than the plate 120, and therefore the plate 120 exhibits an improved heat radiation performance when exposed to the outside. As a result, friction heat generated when the chain slides against the travel guiding portion 111 can be discharged efficiently.

Second Embodiment

Figure 9:
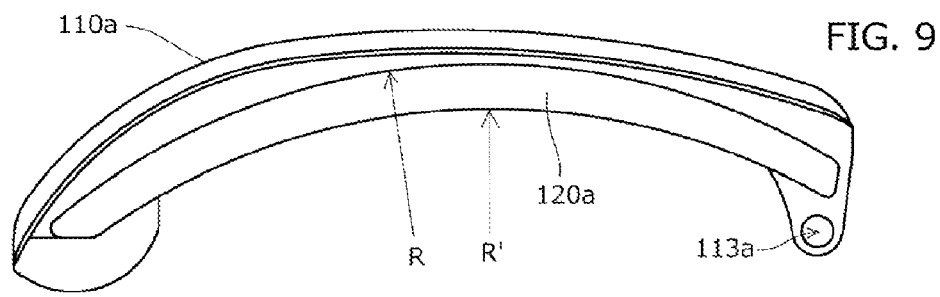
FIG. 9 is a sectional view corresponding to FIG. 8 but showing a chain guide according to a second embodiment of the present invention.

In a chain guide (a swinging guide) according to a second embodiment of the present invention, as shown in FIG. 9, a plate 120a is formed to have a constant curvature radius respectively on both an upper end surface on a travel guiding surface side and a lower end surface on an opposite side, and a curvature radius R of the upper end surface is set to be smaller than a curvature radius R' of the lower end surface.

Excluding the fact that the plate housing portion of a guide shoe 110a is aligned with the plate 120a, all other configurations are similar to the chain guide 100 according to the first embodiment.

With the chain guide according to the second embodiment of the present invention, the up-down direction dimensions of respective end portions of the plate 120a can be reduced in comparison with an intermediate portion, enabling a reduction in the up-down direction dimension of the plate end holding portion, and as a result, the attachment portion of the guide shoe 110a can be reduced in size while avoiding overlap between an attachment hole 113a and the plate housing portion.

Figure 17:
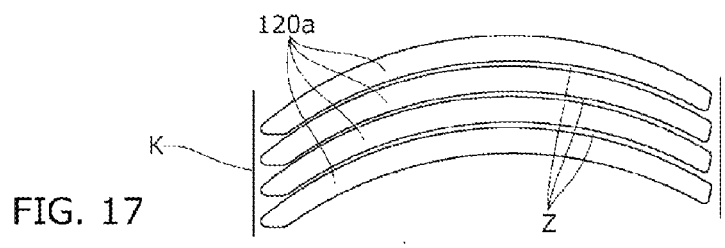
FIG. 17 is an illustrative manufacturing diagram showing a plate of the chain guide according to the second embodiment of the present invention.

Moreover, the plate 120a can be formed in a simple shape such that a die for punching the plate 120a out of rolled steel plate can be simplified, and as shown in FIG. 17, the amount of remaining material z generated when the plate 120a is punched out of the rolled steel plate K can be reduced even further, enabling a further reduction in material cost.

Furthermore, since the plate 120a is formed in a shape having an unvarying curvature radius in the lengthwise direction, stress concentration does not occur when the plate 120a receives force, and as a result, the rigidity and strength thereof can be improved.

Third Embodiment

Figure 10:
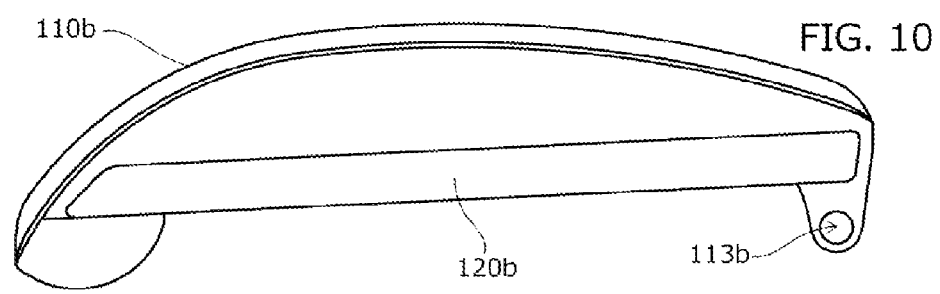
FIG. 10 is a sectional view corresponding to FIG. 8 but showing a chain guide according to a third embodiment of the present invention.

In a chain guide (a swinging guide) according to a third embodiment of the present invention, as shown in FIG. 10, a plate 120b is formed in a rectilinear shape on both the upper end surface on the travel guiding surface side and the lower end surface on the opposite side.

Excluding the fact that the plate housing portion of a guide shoe 110b is aligned with the plate 120b, all other configurations are similar to the chain guide 100 according to the first embodiment.

In the chain guide according to the third embodiment of the present invention, the plate 120b is formed in a rectilinear shape, and therefore an operation insert the plate 120b fixedly into the plate housing portion can be performed easily.

Figure 18:
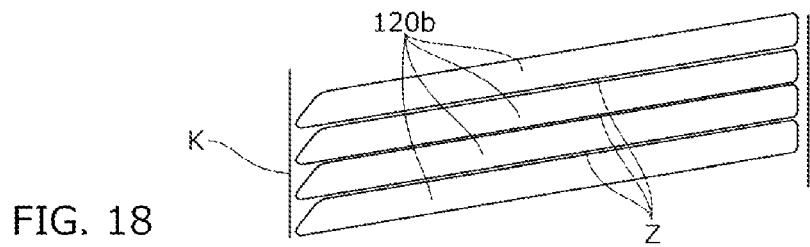
FIG. 18 is an illustrative manufacturing diagram showing a plate of the chain guide according to the third embodiment of the present invention.
Figure 19:
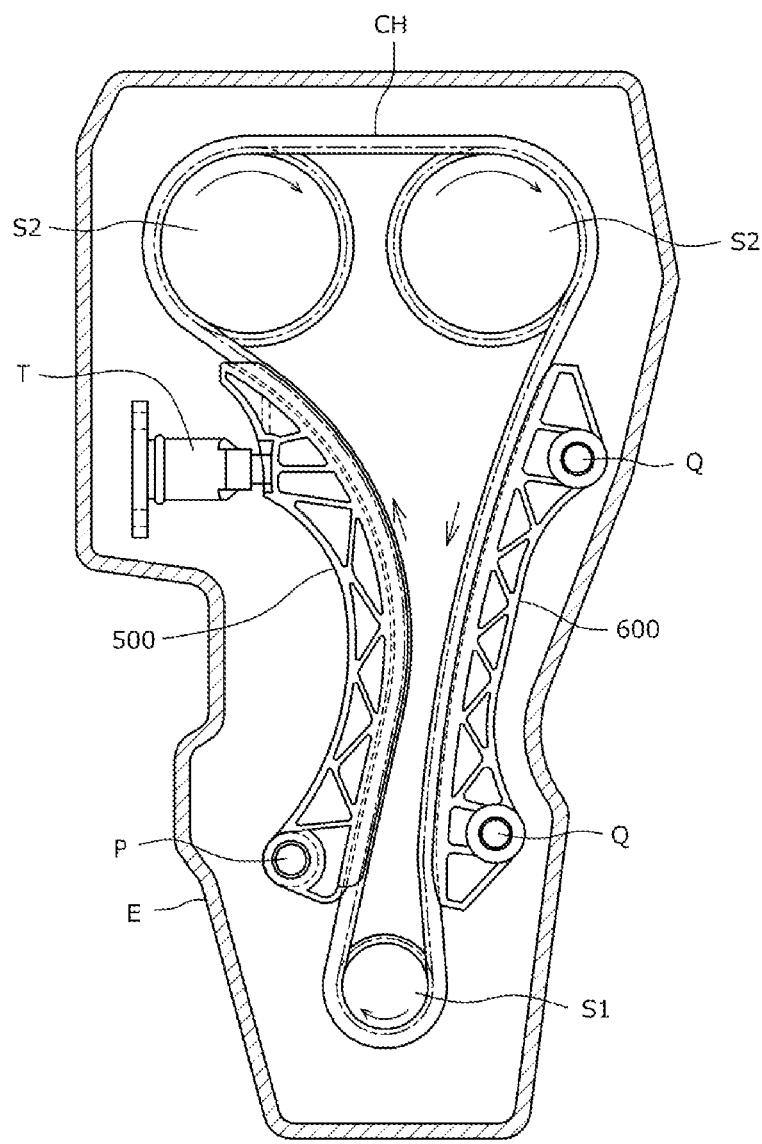
FIG. 19 is an illustrative view showing a conventional timing system of an engine.
Figure 20:
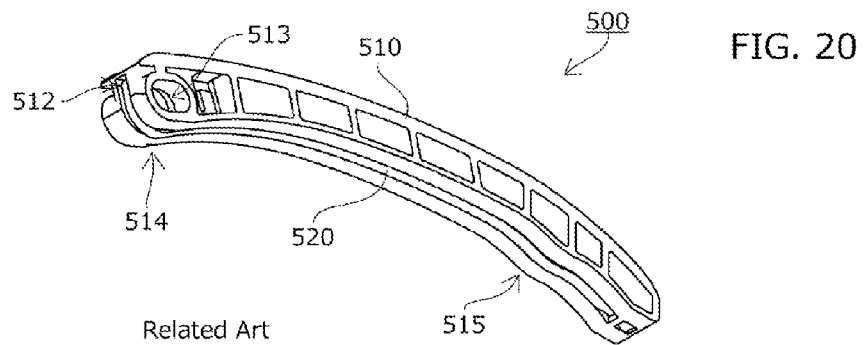
FIG. 20 is a perspective view showing a conventional chain guide.
Figure 21:
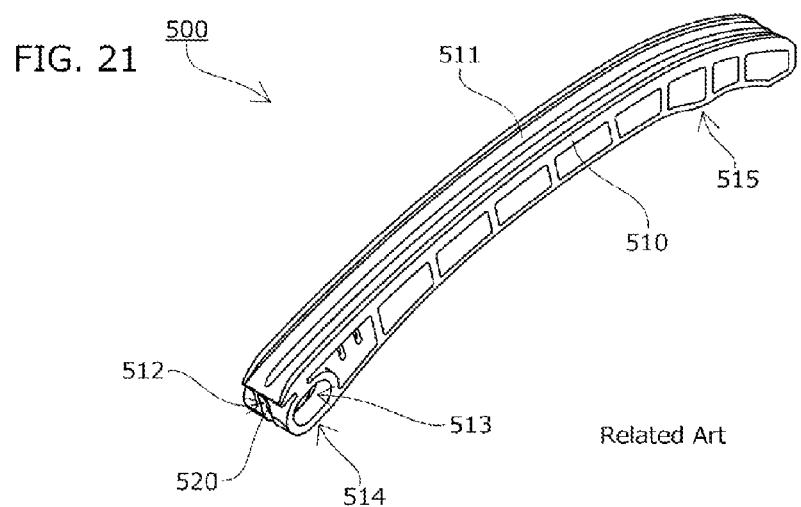
FIG. 21 is a perspective view showing FIG. 20 from another direction.
Figure 22:
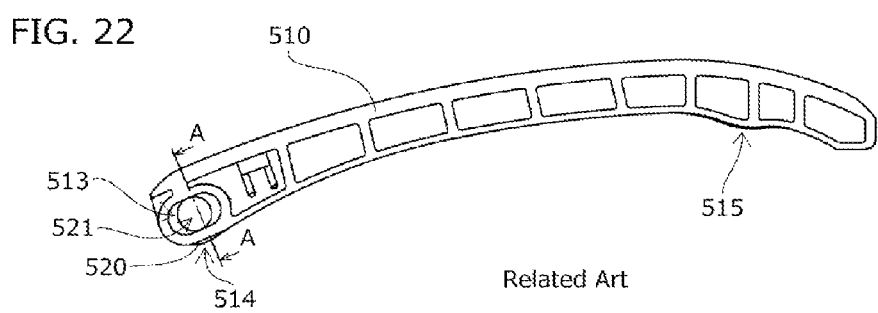
FIG. 22 is a side view of the chain guide shown in FIG. 20.
Figure 23:
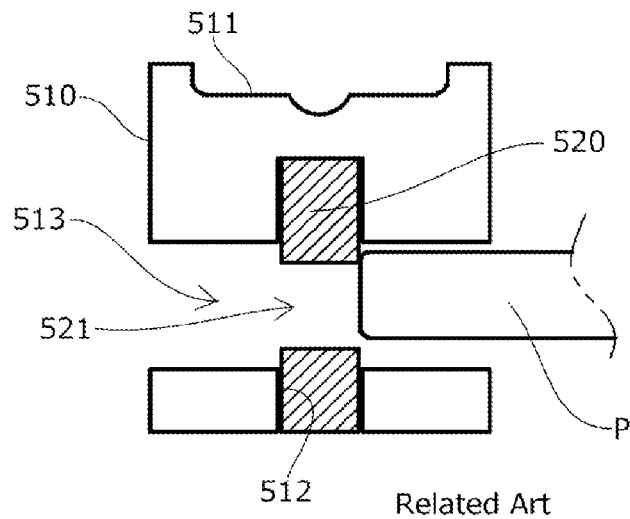
FIG. 23 is a sectional illustrative view showing an A-A cross-section of FIG. 22.
Figure 24:
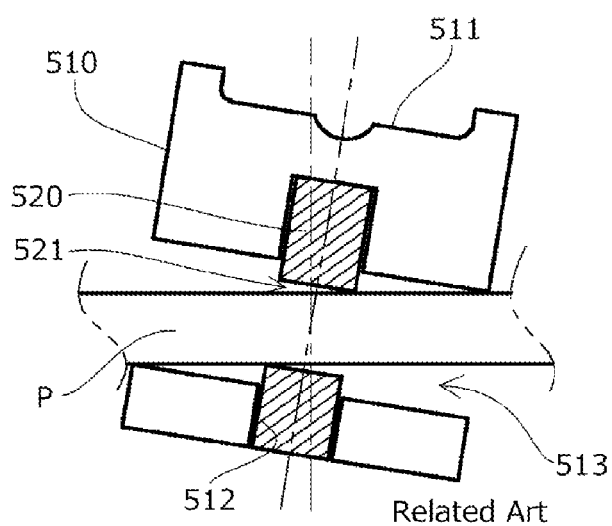
FIG. 24 is an illustrative view showing FIG. 23 in another condition.
Figure 25:
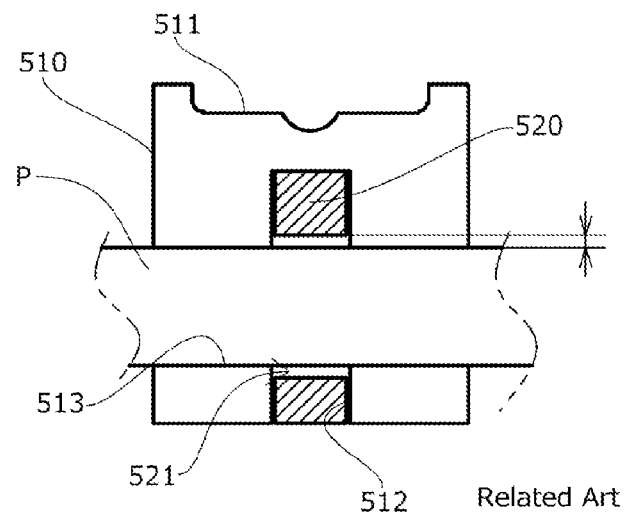
FIG. 25 is an illustrative view showing FIG. 23 in yet another condition.
Figure 26:
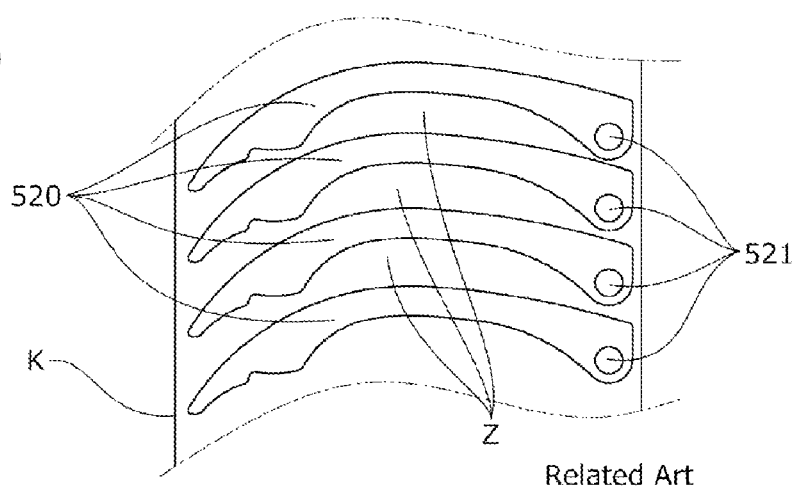
FIG. 26 is an illustrative manufacturing diagram showing a plate of the conventional chain guide.

Moreover, the plate 120b can be formed in a simple shape such that a die for punching the plate 120b out of rolled steel plate can be simplified, and as shown in FIG. 18, substantially no remaining material Z is generated on either end portion when the plate 120b is punched out of the rolled steel plate K, enabling a further reduction in material cost.

Furthermore, since the plate 120b has a uniform rectilinear shape, stress concentration does not occur when the plate 120b receives force, and as a result, the rigidity and strength thereof can be improved.

Fourth Embodiment

Figure 11:
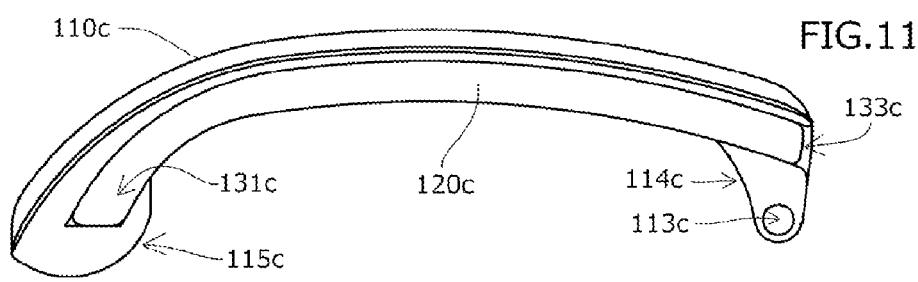
FIG. 11 is a sectional view corresponding to FIG. 8 but showing a chain guide according to a fourth embodiment of the present invention.

In a chain guide (a swinging guide) according to a fourth embodiment of the present invention, as shown in FIG. 11, a plate end holding portion 131c is provided in the tensioner contact portion 115c, and a plate insertion hole 133c is provided to open through the attachment portion 114c.

All other configurations, excluding the configuration and arrangement of the plate fixing piece (not shown), are similar to the chain guide 100 according to the first embodiment.

The chain guide according to the fourth embodiment of the present invention is assembled by inserting the plate 120c from the tensioner contact portion 115c side (a left side of the drawing) such that an end portion of the plate 120c on a right side of the drawing projects from the plate insertion hole 133c in the attachment portion 114c, and then inserting an end portion of the plate 120c on the left side of the drawing into the plate end holding portion 131c to be held thereby.

The end portion of the plate 120c on the left side of the drawing is slightly enlarged, and therefore the plate 120c is fixed by inserting the plate 120c such that the plate end holding portion 131c undergoes slight elastic deformation. Instead, however, a separate plate fixing piece, not shown in the drawing, may be provided in an appropriate position.

With the chain guide according to the fourth embodiment of the present invention, there is no need to open a plate insertion hole in the front surface of the travel guiding portion, and therefore restrictions on the shape of the front surface of the travel guiding portion that slides against the chain are eliminated, leading to an improvement in design freedom.

Fifth Embodiment

In a chain guide (a swinging guide) according to a fifth embodiment of the present invention, as shown schematically in FIG. 12, at least the plate end holding portion of a plate housing portion 130d is formed to open only to the side such that a plate 120d can be inserted therein only from the side, and an engagement piece 134d for preventing the plate 120d from falling out is provided in an appropriate position above the open side.

Further, a plate insertion hole into which the plate 120d can be inserted in the chain travel direction is not required.

All other configurations are similar to the chain guides according to the first to fourth embodiments.

With the chain guide according to the fifth embodiment of the present invention, the plate 120d can be inserted directly from the side, and therefore an operation to insert the plate 120d fixedly can be performed easily.

Furthermore, since there is no need to open a plate insertion hole in the front surface of the travel guiding portion, restrictions on the shape of the front surface of the travel guiding portion that slides against the chain are eliminated, leading to an improvement in design freedom.

Sixth Embodiment

In a chain guide (a swinging guide) according to a sixth embodiment of the present invention, as shown schematically in FIG. 13, a plate end holding portion 131e of a plate housing portion 130e is shaped such that a plate 120e can be inserted therein diagonally from the side.

Further, a plate insertion hole into which the plate 120e can be inserted in the chain travel direction is not required.

All other configurations are similar to the chain guides according to the first to fifth embodiments.

With the chain guide according to the sixth embodiment of the present invention, the plate 120e can be inserted diagonally from the side, and there is therefore no need to provide a plate insertion hole. As a result, an improvement in the design freedom of a guide shoe 110e is achieved.

Seventh Embodiment

In a chain guide (a swinging guide) according to a seventh embodiment of the present invention, as shown schematically in FIG. 14, two or three plates 120f, 120g are overlapped in a width direction and inserted thus into plate housing portions 130f, 130g.

All other configurations are similar to the chain guides according to the first to sixth embodiments.

Further, the number of overlapped plates may be set at four or more.

With the chain guide according to the seventh embodiment of the present invention, the respective plates 120f, 120g can be reduced in thickness, enabling a reduction in the cost required to punch the plates 120f, 120g out of rolled steel plate or the like. Furthermore, by inserting the plates 120f, 120g in a plurality, the overall required strength, rigidity, and durability can be secured.

Eighth Embodiment

Figure 15:
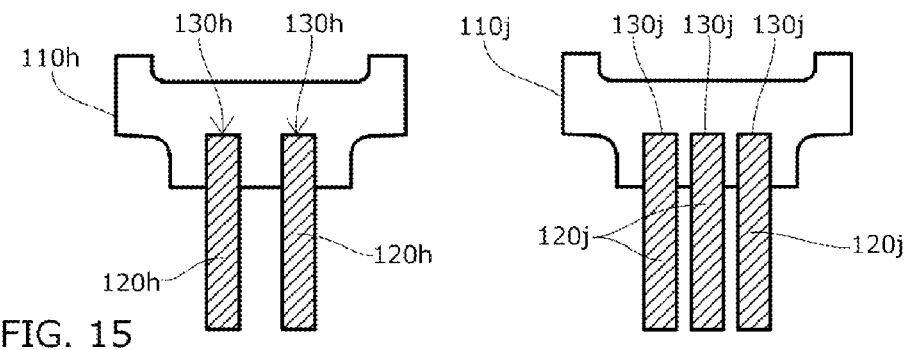
FIG. 15 is a sectional illustrative view showing a chain guide according to an eighth embodiment of the present invention.

In a chain guide (a swinging guide) according to an eighth embodiment of the present invention, as shown schematically in FIG. 15, two or three plate housing portions 130h, 130j are provided in parallel in the width direction, and plates 120h, 120j are inserted individually into the respective plate housing portions 130h, 130j.

All other configurations may be made similar to the chain guides according to the first to seventh embodiments, and the parallel plate housing portions 130h, 130j may be provided in respectively different forms.

Further, the number of plate housing portions provided in parallel may be set at four or more.

With the chain guide according to the eighth embodiment of the present invention, the respective plates 120h, 120j can be reduced in thickness, enabling a reduction in the cost required to punch the plates 120h, 120j out of rolled steel plate or the like. Furthermore, by inserting the plates 120h, 120j in a plurality, the overall required strength, rigidity, and durability can be secured.

Moreover, the plurality of plates 120h, 120j can be inserted in and fixed to the separate plate housing portions 130h, 130j individually, and therefore the plates 120h, 120j do not have to be bundled and handled simultaneously even when provided in a plurality. As a result, an operation to insert the plates 120h, 120j fixedly can be performed easily.

The respective embodiments described above are specific examples of the chain guide (a swinging guide) according to the present invention, but the chain guide according to the present invention is not limited to these embodiments, and may also be applied to a chain guide (a fixed guide) in which attachment portions are provided in a plurality of locations.

Further, shapes, positions, dimensions, positional relationships, and so on of the respective constituent members may be modified variously.

Moreover, in the above embodiments, the chain guide is provided in an engine having a timing system, but the present invention is not limited thereto and may be applied to various other devices.

Furthermore, the present invention is not limited to a transmission mechanism using a chain, and may be applied to a similar transmission mechanism using a belt, a rope, or the like, and used widely in various industrial fields.

What is claimed is:

1. A chain guide having a guide shoe that guides a traveling chain by sliding against said traveling chain, and a plate that reinforces said guide shoe in a chain travel direction, wherein
    said guide shoe has a travel guiding portion that extends in said chain travel direction, a plate housing portion which is formed on a rear surface side of said travel guiding portion, and into which said plate can be inserted, and at least one of an attachment portion for attaching said guide shoe to an attachment subject and a tensioner contact portion that contacts a tensioner,
    in at least one location of said attachment portion or said tensioner contact portion, said plate housing portion constitutes a plate end holding portion formed to be capable of supporting an end portion of said plate from below such that said plate can be inserted therein from a direction other than from below,
    said plate housing portion comprises a plate insertion hole into which said plate can be inserted in said chain travel direction, and
    said plate insertion hole opens onto a front surface of said travel guiding portion.

2. The chain guide according to claim 1, wherein said guide shoe comprises an attachment portion provided with an attachment hole for attaching said guide shoe to said attachment subject, and
    said attachment hole does not overlap said plate housing portion.

3. The chain guide according to claim 1, wherein said plate housing portion comprises a plate fixing piece that restricts movement of said plate in said chain travel direction.

4. A guide shoe having a travel guiding portion that extends in a chain travel direction and a plate housing portion which is formed on a rear surface side of said travel guiding portion, and into which a plate can be inserted, wherein
    said guide shoe has at least one of an attachment portion for attaching said guide shoe to an attachment subject and a tensioner contact portion that contacts a tensioner,
    in at least one location of said attachment portion or said tensioner contact portion, said plate housing portion constitutes a plate end holding portion configured to support an end portion of said plate from below such that said plate can be inserted therein from a direction other than from below,
    said plate housing portion comprises a plate insertion hole into which said plate can be inserted in said chain travel direction, and
    said plate insertion hole opens onto a front surface of said travel guiding portion.

* * * * *